(12) United States Patent
Bruggeman

(10) Patent No.: US 7,874,757 B2
(45) Date of Patent: Jan. 25, 2011

(54) WINDOW CLEANING APPARATUS WITH DEIONIZATION CARTRIDGE

(75) Inventor: Daniel J. Bruggeman, Minneapolis, MN (US)

(73) Assignee: Diversified Dynamics Corporation, Minneapolis, MN (US)

(*) Notice: Subject to any disclaimer, the term of this patent is extended or adjusted under 35 U.S.C. 154(b) by 1009 days.

(21) Appl. No.: 11/708,982

(22) Filed: Feb. 21, 2007

(65) Prior Publication Data

US 2008/0199245 A1 Aug. 21, 2008

(51) Int. Cl.
 *A46B 11/06* (2006.01)
(52) U.S. Cl. ...................... 401/289; 401/270
(58) Field of Classification Search .......... 401/289, 401/270; 239/310, 462, 575, 590; 137/140, 137/237–246.23, 255–268, 515, 544–550, 137/625.18–625.19, 625.46
See application file for complete search history.

(56) References Cited

U.S. PATENT DOCUMENTS

| | | | | |
|---|---|---|---|---|
| 1,321,586 A | * | 11/1919 | Bachman | 137/264 |
| 4,340,179 A | * | 7/1982 | Knapp | 239/310 |
| 4,512,955 A | * | 4/1985 | Etani | 422/266 |
| 4,635,663 A | | 1/1987 | Rollins et al. | |
| 5,249,326 A | | 10/1993 | Jefferies et al. | |
| 5,364,198 A | * | 11/1994 | Skenderi | 401/138 |
| 5,927,610 A | * | 7/1999 | Dutcher | 239/317 |
| RE36,649 E | | 4/2000 | Jefferies et al. | |
| 6,158,678 A | | 12/2000 | Lange | |
| 6,562,142 B2 | | 5/2003 | Barger et al. | |
| 6,846,512 B2 | | 1/2005 | Rohrbaugh et al. | |
| 6,869,028 B2 | | 3/2005 | Bartsch et al. | |
| 7,008,130 B1 | * | 3/2006 | Hill | 401/27 |
| 2002/0046969 A1 | | 4/2002 | Bartsch et al. | |
| 2002/0102359 A1 | | 8/2002 | Rohrbaugh et al. | |
| 2002/0108640 A1 | | 8/2002 | Barger et al. | |
| 2002/0144712 A1 | | 10/2002 | Barger et al. | |
| 2002/0160224 A1 | | 10/2002 | Barger et al. | |
| 2002/0185420 A1 | | 12/2002 | Horstman et al. | |
| 2003/0034051 A1 | | 2/2003 | Barger et al. | |
| 2004/0112411 A1 | | 6/2004 | Boykin et al. | |
| 2005/0161530 A1 | | 7/2005 | Bartsch et al. | |

FOREIGN PATENT DOCUMENTS

WO WO 97/48927 A1 12/1997
WO WO 98/01223 A1 1/1998

* cited by examiner

*Primary Examiner*—David J Walczak
(74) *Attorney, Agent, or Firm*—Gerald E. Helget; Nelson R. Capes; Briggs and Morgan, P.A.

(57) ABSTRACT

A cleaning apparatus for cleaning surfaces connects to a water source, and uses a portable cylindrical deionized water unit, a garden hose, a replaceable ion exchange resin cartridge, a brush pole system, and a second hose.

11 Claims, 5 Drawing Sheets

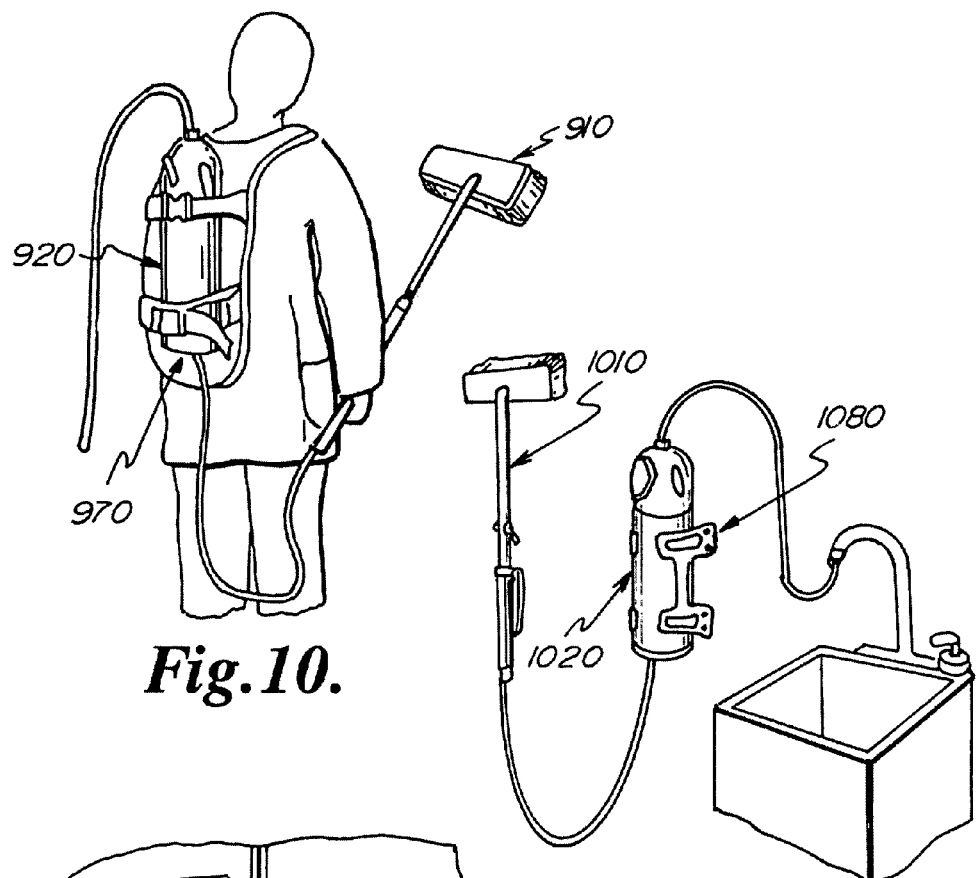
*Fig.10.*
*Fig.11.*
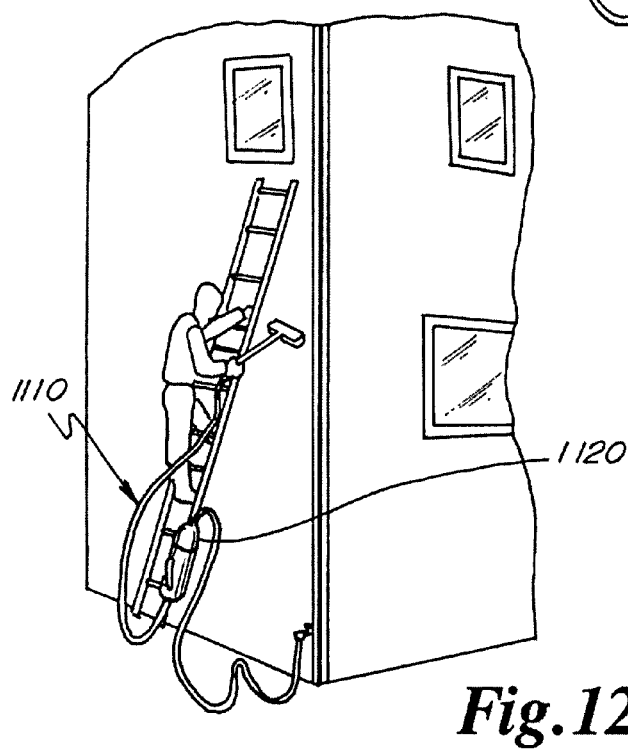
*Fig.12.*

WINDOW CLEANING APPARATUS WITH DEIONIZATION CARTRIDGE

FIELD OF THE INVENTION

The present invention relates to a portable cylindrical deionized water apparatus for cleaning a variety of surfaces including ceramic, steel, plastic, glass, and/or painted surfaces, such as an exterior surface of a building or a vehicle by applying cleaning composition to the surfaces, and then rinsing the surfaces with deionized water.

BACKGROUND OF THE INVENTION

Products for cleaning hard surfaces are widely available on the market. These products are used for two purposes, the first being to clean soil from the surface and the second being to leave the surface with an aesthetically pleasing finish, e.g. spot-free or shiny. However, products available on the market often require rinsing with water after use. Typically when the water dries from the surface water-marks, smears, streaks, or spots are left behind.

These water-marks, it is believed may be due to the evaporation of water from the surface leaving behind deposits of minerals which were present as dissolved solids in the water, for example calcium, magnesium and sodium ions and salts thereof or may be deposits of water-carried soils, or even remnants from a cleaning product, for example soap scum. Droplets or beads of water can dry to leaving noticeable spots or marks known as water-marks. This problem is particularly apparent when cleaning ceramic, steel, plastic, glass or painted surfaces. A means of solving this problem, known in the art is to dry the water from the surface using a squeegee or cloth or chamois before the water-marks form. However, this drying process is time consuming and requires considerable physical effort.

PCT Publication WO 97/48927 is directed to a cleaning composition, method, and apparatus for cleaning exterior windows. This publication states that it discloses a no scrub/no wipe method for cleaning exterior windows without filming or spotting. A spray gun comprising separate chambers for a cleaning composition and an ion exchange resin is disclosed. The method involves spraying a cleaning composition on the window surface, preparing purified rinse water by passing the rinse water through the ion exchange resin and rinsing the window surface with the purified rinse water. While the use of this spray gun, may initially solve the problem of residual water marks on surfaces on drying, it is has been reported that some spray guns have an inefficiently short life-span that requires the user to replace the ion-exchange resin cartridge after each use.

PCT Publication WO 98/01223 is directed to a portable hand held device for converting tap water into a spray of deionized water. This publication states that it discloses a device for producing a controlled spray of deionized water, useful for rinsing cars and windows. This publication further states that the prior art has failed to provide teachings of a lightweight and readily portable, economical device and method for "real time" conversion of tap water into deionized water which can be used to, among other things, rinse surfaces after cleaning without leaving water spots if the surface is not wiped dry.

While spray guns and other hand held device, such as the above examples, are portable, there are some problems. For example, hand held devices are inherently limited in size, weight, and bulkiness to accommodate their hand held use. Thus, hand held units usually have an ion exchange resin cartridge inside the spray gun. This limits the size of the ion exchange resin cartridge, and consequently the life span of the ion exchange resin cartridge is short, and may require more frequent changes. In addition, a person washing a building or large surface may want to soak or brush the surface or bring the pressurized water closer to the surface without mounting a ladder or other type of extension. A spray gun is not optimum in these instances.

Thus, a need exists for an improved deionizing water apparatus that efficiently cleans a surface without the appearance of water-marks. There is a need for an improved apparatus not suffering from the limitations of hand held spray guns, such as short life of the ion exchange cartridges. There is a need for a deionized water apparatus that improves portability and longevity based on larger ion exchange resin cartridges, and extends usage in a variety of situations requiring a portable unit.

SUMMARY OF THE INVENTION

A portable apparatus for cleaning surface that: connects to a water source, mixes cleaning solution with water for cleaning; and follows the cleaning phase by converting water into deionized water to provide spot free rinse. The portable apparatus is mobile, useful for a variety of cleaning projects, and has advantages over spray guns, previously discussed (above).

The invention, an apparatus for cleaning surfaces such as windows, connects to a water source and uses a portable cylindrical deionized water unit, a garden hose, a replaceable ion exchange resin cartridge, a brush pole system, and a second hose. The cylindrical deionized water unit has an inlet opening, an outlet opening, first and second separate interior chambers; and a valve with first and second positions. The valve at the first position directs water flow through the inlet opening into the first chamber and out through the outlet opening. The valve at the second position directs the water flow through the second chamber and out through the outlet opening. A garden hose connects the inlet opening to the water source. A replaceable ion exchange resin cartridge fits into the second chamber. The brush pole system uses: a hollow pole with an inlet portal, an outlet portal, and a brush. A second hose with a first end that connects to the outlet opening of the cylindrical deionized water unit; and the second hose with a second end connects to the inlet portal of the hollow pole.

BRIEF DESCRIPTION OF THE DRAWINGS

FIG. 10 illustrates a user with an optional back pack holding the portable cylindrical deionized water unit of the invention.

FIG. 11 illustrates the portable cylindrical deionized water unit of the invention mounted on a wall.

FIG. 12 illustrates the portable cylindrical deionized water unit of the invention attached to a ladder.

DETAILED DESCRIPTION OF THE PREFERRED EMBODIMENT

Figure 1:
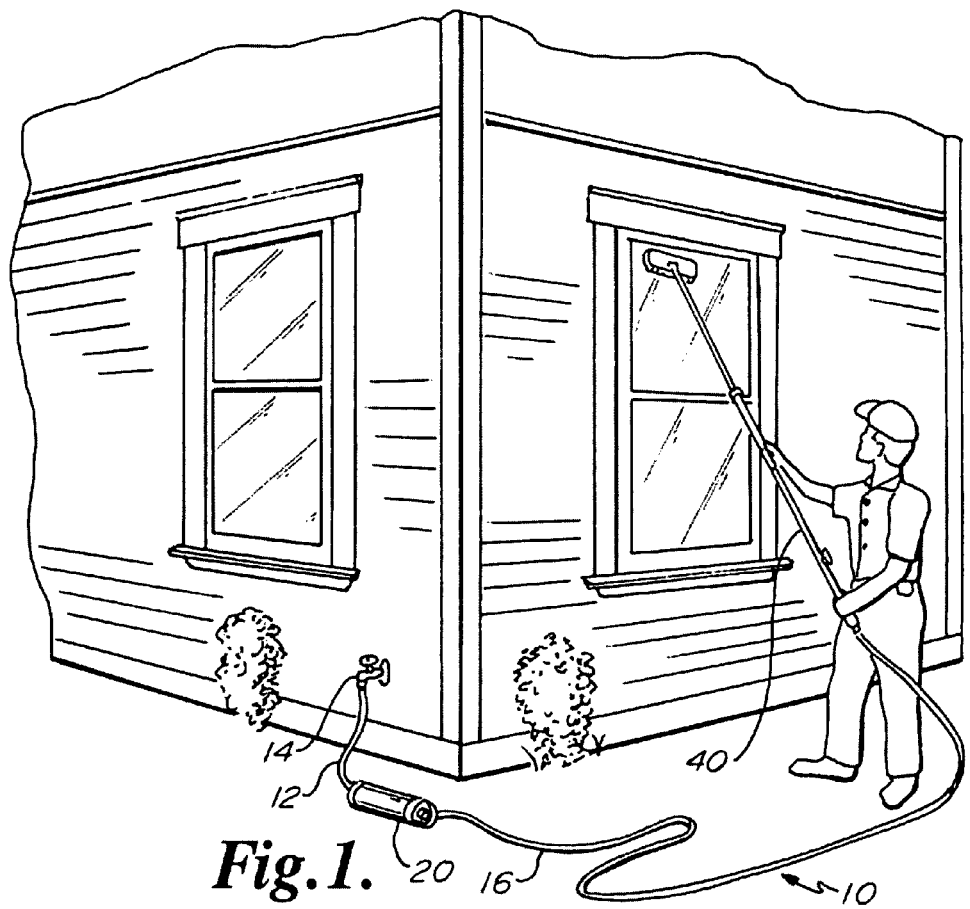
FIG. 1 shows an embodiment of the invention, connected to a water source and a brush at one end is being used to clean windows on a building structure.

The invention provides a portable deionized water apparatus for cleaning surfaces such as the exterior surface of a building or vehicle. The invention enables the user to apply a cleaning composition to the surface, and then rinse the surface with deionized water.

A cylindrical deionized water unit, according to the invention, includes a valve having first and second positions. When the valve is in the clean position (also referred to as the first position) water flows through a first chamber in the deionized water unit, and out the deionized water unit. The water ultimately mixes with cleaning composition, downstream of the deionized water unit, before flowing out through a brush onto the surface to be cleaned. The cleaning solution can remain on the surface for a suitable time period, but preferably not allowed to dry before the rinse. A person can determine the time period before drying based on the cleaning agent used and the instructions on the packaging.

When the valve is in the rinse position (referred to as the second position), water flows through an ion exchange resin cartridge in the second chamber of the deionized water unit, thereby deionizing the water. The deionized water ultimately flows out the deionized water unit through a hose, and into a brush pole system for use as rinse water.

The cleaning composition used in the present invention can take various forms such as liquid, slurry, solid, and loose or compacted powder. The user can select from various products on the market used for cleaning ceramic, steel, plastic, glass, and/or painted surfaces, such as car wash cleaning products for a vehicle or window wash solutions for windows. As discussed above, such products are readily available with instructions for usage.

Unlike spray guns attached to the end of a garden hose, the present invention offers several advantages. Because the user does not need to hold the deionized water unit, the limitations inherent in spray guns are not present in the invention (10). For example, the portable deionized water unit (20), shown in FIG. 1, lies upon the ground between a garden hose (12) connected to the water source (14) (a faucet as water source) and a second hose (16) attached to a brush pole system (40). The deionized water unit can be pulled along the ground while brushing the windows (shown in FIG. 1). The cylindrical shape of the unit is easier to move than boxy (or other type) housing for deionization of the water, and the streamline shape of the invention eliminates sharp edges that can hinder movement of the unit.

In addition, the portable cylindrical deionized water unit of the invention, has amazing versatility, and can be optionally mounted to various structures. See FIGS. 10-12. For example, the deionized water unit (920) of the invention (910) can be attached to a user's back with a back pack (970) modified to hold the unit as shown in FIG. 10. In FIG. 11, the deionized water unit (1020) of the invention (1010) is shown seated in a wall mount (1080). In FIG. 12, the deionized water unit (1120) of the invention (1110) is shown attached to a ladder. Although the apparatus for attachment to the ladder is not shown in FIG. 12, a band encircling the deionized water unit with a hook can be used to attach the deionized water unit to the ladder, or other suitable structure can be used, and are within the knowledge of people skilled in the field.

The use of two hoses, according to the invention, permits greater versatility because the user can replace the length of the garden and/or second hose to accommodate the needs for each cleaning job. In an embodiment, common garden hoses can be used as the replacement or original hoses in the invention.

Figure 8:
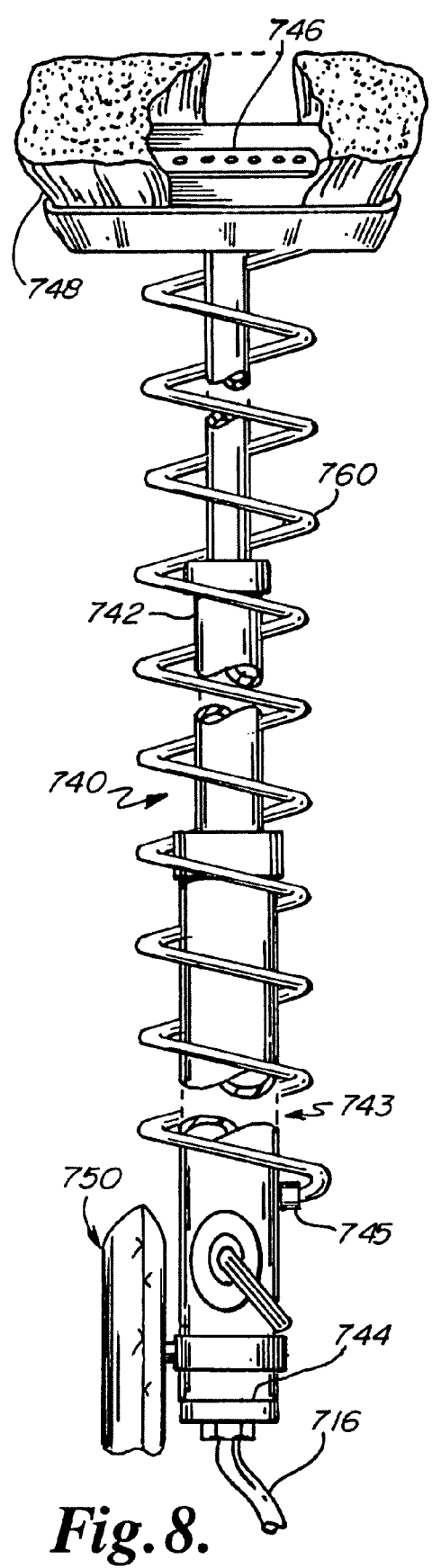
FIG. 8 illustrates a brush telescoping hollow pole system, according to the invention, in a compacted position.
Figure 9:
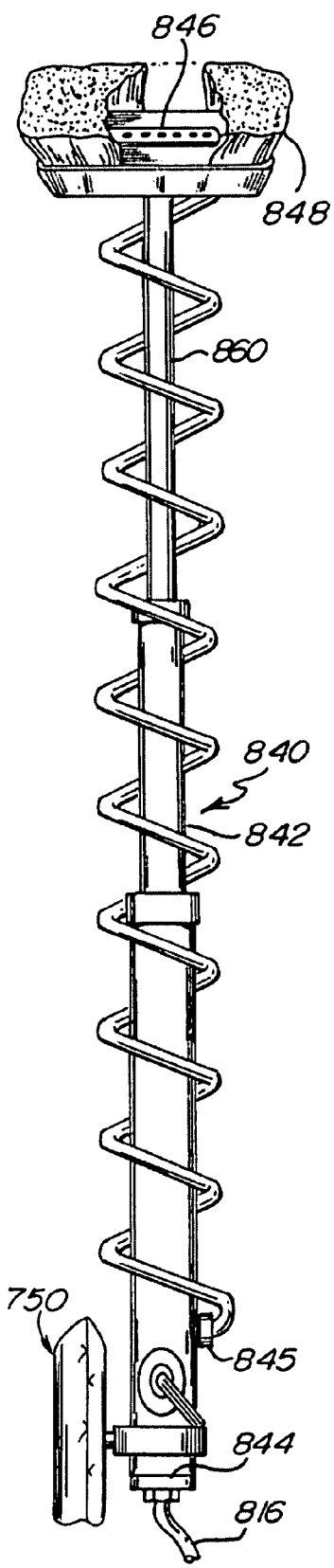
FIG. 9 illustrates a brush telescoping hollow pole system, according to the invention, in an extended position.

The invention uses a brush pole system instead of a spray gun. The user can brush or scrub the surface enhancing the cleaning ability over spray guns. An embodiment of the invention uses a hollow pole (FIG. 1) or a telescoping hollow pole (FIGS. 8-9). The brush used with the pole can be permanent or replaceable. Optionally, the replaceable brush can accommodate different brushes, replacement brushes, or other cleaning tools. An example of a brush is shown in FIGS. 8 and 9 (in the cutaway section) the brush has an outlet portal with a plurality of smaller openings (746, 846) facing outward into the brush (748, 848).

As depicted in FIG. 1, a user is cleaning the exterior windows of a house with an embodiment of the invention. The embodiment of the invention (10) has a garden hose (12) connected at one end to a water source (14), which is an exterior faucet, and the other end is connected to a portable cylindrical deionized water unit (20). A second hose (16) connects the deionized water unit (20) to a brush pole system (40).

Figure 2:
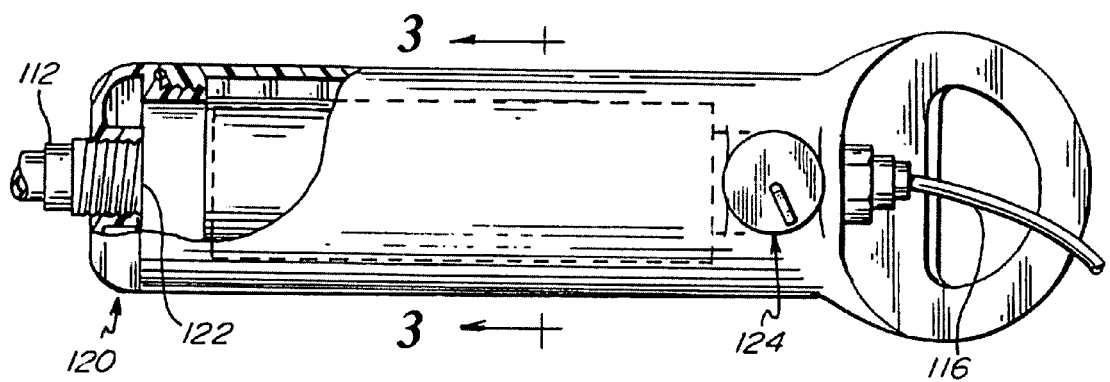
FIG. 2 illustrates a partial cutaway of a portable cylindrical deionized water unit according to the present invention.
Figure 4:
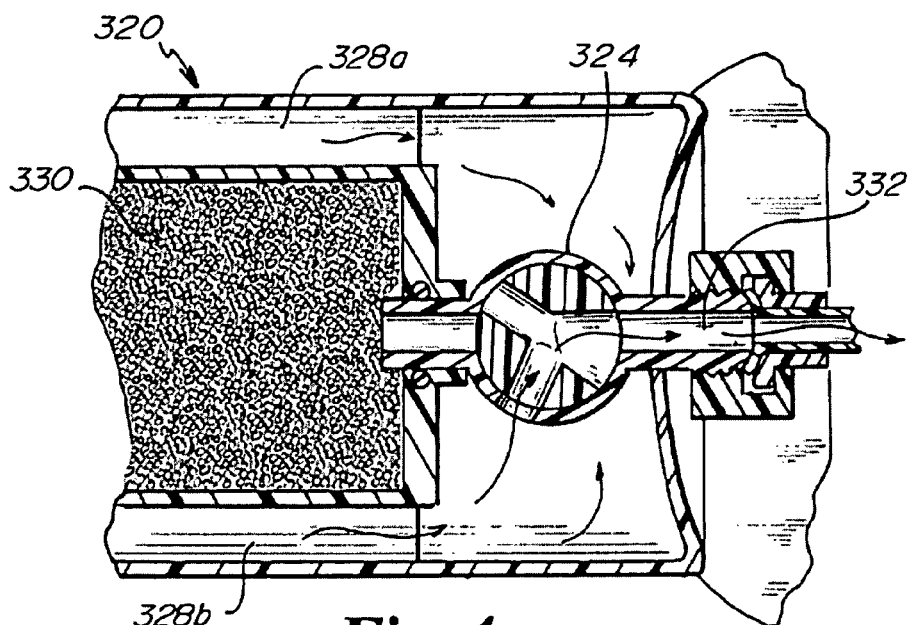
FIG. 4 is a partial sectional view of the interior of a portable cylindrical deionized water unit showing a valve opened in a first position also referred to as a clean position.

FIG. 2 illustrates a partial cutaway of a cylindrical deionized water unit (120). The cutaway of the deionized water unit (120) exposes the interior showing an inlet opening (122), and a garden hose (112) connected to the deionized water unit. The garden hose attaches to a threaded end, shown in the cutaway. The second hose (116) connects to an outlet opening (not shown in this FIG.) of the deionized water unit (120). FIG. 4 shows the outlet opening (332) of the deionized water unit (320). The exterior of the deionized water unit (120) shows a valve (124) that can switch between a first and second position.

Figure 3:
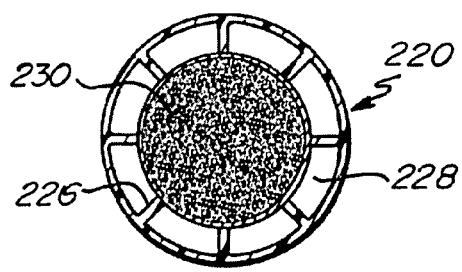
FIG. 3 depicts a sectional view of the portable cylindrical deionized water unit taken along section lines 3-3 shown in FIG. 2.

FIG. 3 depicts a sectional view of the cylindrical deionized water unit taken along section lines 3-3 as shown in FIG. 2. The sectional view of the deionized water unit (220) reveals interior ribs (226) that separates the deionized water unit (220) into a coaxial outer chamber (228) and a central resin exchange chamber (not shown as separate from the ion resin exchange cartridge ). The replaceable ion resin exchange cartridge (230) is shown in all figures as seated in the central resin exchange chamber.

Although not shown, the invention envisions that embodiments with two or more separate chambers, not of a coaxial orientation, can also be used in the invention. For example, the two chambers can be side by side separate tube wherein a first chamber lacks an ion resin exchange cartridge, and a second chamber has an ion resin exchange cartridge, thereby allowing for use of cleaning solution water in one pathway and deionized rinse water in the other pathway.

The replaceable ion resin exchange cartridge can comprise a mixture of anionic and cationic resins. Ion exchange resins are well known in the prior art. Examples of resin exchange ions are shown in: PCT WO97/48927, to Hawes et al, entitled "*Cleaning Composition, Method, And Apparatus For Cleaning Exterior Windows*," at pages 16-17, describe a mixture of anionic and cationic resins suitable for an ion resin exchange cartridge; and U.S. Pat. No. 6,562,142, to Barger et al, entitled "*System And Method For Cleaning And/Or Treating Vehicle And The Surface Of Other Objects*," Column 9.

FIG. 4 depicts a partial sectional view of the interior of the cylindrical deionized water unit (320) with an interior valve structure (324) corresponding to a first position of the valve (124). In the first position, or "clean" position, the interior valve structure (324) opens fluid communication allowing water to flow through the coaxial outer chamber (328). In the clean position, arrows show water flowing into the coaxial outer chamber (328*a*, 328*b*), and out the outlet opening (332). In this position, the water does not flow through the ion resin exchange cartridge (330). In FIG. 4, when the interior valve structure (324) is in the clean position, the water flows into the coaxial chamber (328*a*, 328*b*) as the path of least resistance.

Figure 5:
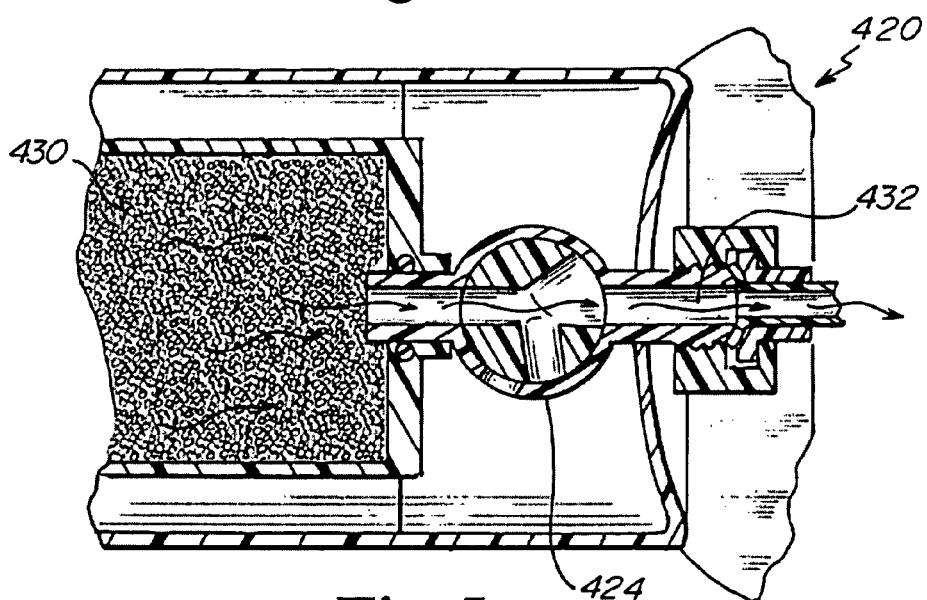
FIG. 5 is a partial sectional view of the interior of a portable cylindrical deionized water unit showing a valve opened in a second position also referred to as a rinse position.

FIG. 5 depicts a partial sectional view of the interior of the portable cylindrical deionized water unit (420) with an interior valve structure (424) corresponding to a second position of the valve (124). In this second position, the "rinse" position, the interior valve structure (424) opens fluid communication allowing water to flow through the central resin exchange chamber. In the rinse position, arrows show the water flowing into the replaceable ion resin exchange cartridge (430) and out the outlet opening (432). In FIG. 5, when the interior valve structure (424) is in the rinse position, water flows into the central resin exchange chamber as the path of least resistance.

Figures 6, 7:
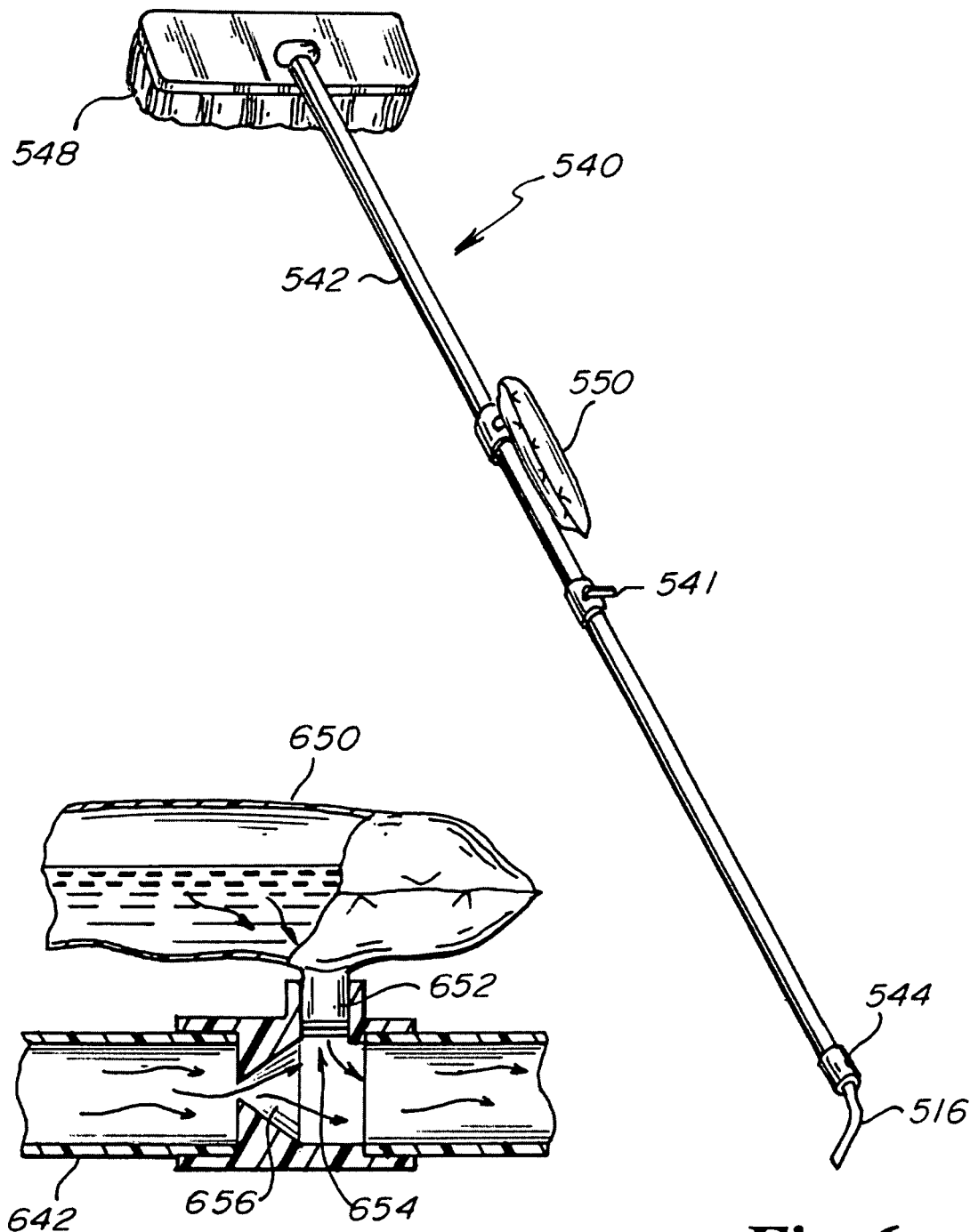
FIG. 6 illustrates a brush pole system of the invention.
FIG. 7 is a sectional view of a cleaning solution container in communication with water flowing through the hollow pole of a brush pole system.

FIG. 6 shows a brush pole system (540) according to the invention. The brush pole system (540) has a hollow pole (542) with an inlet portal (not shown) at the inlet end (544), an outlet portal (shown in FIGS. 10-11 as 746, 846 respectively), a cleaning portal (not shown); an on/off valve (541) on the hollow pole (542) to shut down the water flow; a cleaning solution container (550) with a one way vent opening (not shown); and a brush (548). The cleaning solution container (550) is shown as a collapsible bag; however, other types of containers can be substituted for use in the invention and still be effective. The second hose (516) that connects the deionized water unit (not shown) to the inlet portal (not shown) of the pole is shown attached at the inlet end (544) of the pole (542).

FIG. 7 is a sectional view of the cleaning solution container (550) with a one way vent opening (not shown) from FIG. 6. In FIG. 7, the cleaning solution container (650) has a cleaning solution tube (652) that attaches to the cleaning portal (654) of the hollow pole (542) and is in fluid communication with water flowing through the hollow pole (642). The water mixes with cleaning solution from the cleaning solution container as shown by the arrows in the hollow pole. FIG. 7 shows a venturi structure (656) located in the hollow pole (642) near the cleaning portal (654). The venturi structure (656) creates sufficient suction pulling cleaning solution into the hollow pole (642), and mixes with water. The cleaning solution container (650) has a one way vent opening (not shown) that allows the cleaning solution container to vent when water is not flowing with sufficient pressure or no pressure through the hollow pole (642).

Not shown in FIG. 6 or FIG. 7 is a cleaning solution valve that opens or closes the passage way for the cleaning solution to be mixed with water. When the cleaning solution valve is open, cleaning solution inside the cleaning solution container is in fluid communication with the water flowing through the hollow pole. This cleaning solution valve must be open to mix cleaning solution when the interior valve structure (324) is in the clean position. (See FIG. 4). A cleaning solution valve or other means, such as removing the cleaning solution container, and inserting a plug into the cleaning solution portal can be used in the invention. Another embodiment that can be used with the invention is a disposable cleaning solution container. When the disposable cleaning solution container is empty, then the user can switch to the rinse position.

When the cleaning solution valve is closed, the cleaning solution inside the cleaning solution container does not mix with water flowing through the hollow pole. (See FIG. 5). For rinse water (deionized water), the cleaning solution valve should be closed (if cleaning solution is in the cleaning solution container), and the interior valve structure (424) should be in the rinse position for deionized water.

FIG. 8 shows a brush telescoping hollow pole system (740) of the invention. In FIG. 8, the brush telescoping hollow pole system is in a compact position shown by the three breaks (743) in the pole (742). In FIG. 8, a cutaway of the brush (748) reveals an outlet portal having a plurality of smaller opening (746). The second hose (716) is attached to the inlet portal (not shown) at the inlet end (744). An extension hose (760) attaches to a pole portal (745) at the inlet end (744) located between the cleaning solution portal (not shown) and the outlet portal (746) at the other end.

FIG. 9 shows a brush telescoping hollow pole system (840) of the invention. In FIG. 9, the brush telescoping hollow pole system is in an extended position. A cutaway of the brush (848) reveals the outlet portal having a plurality of smaller opening (846). The second hose (816) is attached to the inlet portal (not shown) at the inlet end (844). An extension hose (860) attaches to a pole portal (845) at the inlet end (844) located between the cleaning solution portal (not shown) and the outlet portal (846) at the other end.

As shown in FIGS. 8-9 respectively, the extension hose (760, 860) coils around the outside of the telescoping hollow pole (742, 842) permitting water to flow through the extension hose (760, 860) in a range of telescoping hollow pole positions from a compact position (shown in FIG. 8) to a fully extended position of the pole (shown in FIG. 9).

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. In addition, while the present invention has been described in connection with certain specific embodiments thereof, it is to be understood that this is by way of illustration and not by way of limitation and the scope of the invention is defined by the appended claims which should be construed as broadly as the prior art will permit.

What is claimed:

1. An apparatus for cleaning surfaces that connects to a water source comprising:

a portable cylindrical deionized water unit having:

an inlet opening, an outlet opening, a plurality of elongate interior ribs that extend along an interior of a coaxial outer chamber that encircle and separate the interior of said unit into the coaxial outer chamber and a coaxial central resin exchange chamber supported and held by the ribs wherein the outer chamber is not in flow communication into the central resin chamber; and a valve with first and second positions located at the outlet opening, wherein the valve at the first position directs water flow only through the inlet opening into the coaxial outer chamber and only out through the outlet opening, the valve at the second position directs the water flow only through the central resin exchange chamber and out only through the outlet opening;

a garden hose that connects the inlet opening to the water source;

a replaceable ion exchange resin cartridge that fits into the central resin exchange chamber;

a brush pole system having a hollow pole with an inlet portal, an outlet portal, and a brush; and a second hose with first and second ends, the first end connects to the outlet opening of the portable cylindrical deionized water unit; and the second end connects to the inlet portal of the pole.

2. The apparatus of claim 1 wherein the hollow pole having a venturi structure, and a cleaning solution portal near the venturi structure to take advantage of suction created by water flowing through the hollow pole in the direction of the outlet portal; and further comprising a cleaning solution container with a one way vent opening, the cleaning solution container connecting to the hollow pole at the cleaning solution port.

3. The apparatus for cleaning surfaces according to claim 2 wherein the cleaning solution container is removable.

4. The apparatus for cleaning surfaces according to claim 3 wherein the cleaning solution container is disposable.

5. The apparatus for cleaning surfaces according to claim 1 wherein the brush is removable.

6. An apparatus for cleaning surfaces that connects to a water source comprising:

a portable cylindrical deionized water unit having:
an inlet opening, an outlet opening, a plurality of elongate interior ribs that extend along an interior of a coaxial outer chamber that encircle and separate the interior of said unit into the coaxial outer chamber and a coaxial central resin exchange chamber supported and held by the ribs wherein the outer chamber is not in flow communication into the central resin chamber; and a valve with first and second positions located at the outlet opening,
wherein the valve at the first position directs water flow only through the inlet opening into the coaxial outer chamber and only out through the outlet opening, the valve at the second position directs the water flow only through the central resin exchange chamber and only out through the outlet opening;

a garden hose that connects the inlet opening to the water source;

a replaceable ion exchange resin cartridge that fits into the central resin exchange chamber;

a telescoping brush pole system having a telescoping hollow pole with an inlet portal, an outlet portal, a pole portal, and a brush;

an extension hose connected to the pole portal at the one end and the outlet portal at the other end,
wherein the extension hose coils around the outside of the pole permitting the water to flow through the extension hose in a range of telescoping hollow pole positions from a compact position to a fully expanded position of the pole; and a second hose with first and second ends, the first end connects to the outlet opening of the portable cylindrical deionized water unit; and the second end connects to the inlet portal of the telescoping pole.

7. The apparatus of claim 6 wherein the telescoping hollow pole having a venturi structure, a cleaning solution portal near the venturi structure to take advantage of suction created by water flowing through the hollow pole in the direction of the outlet portal; and: further comprising a cleaning solution container with a one way vent opening, the cleaning solution container connects to the hollow pole at the cleaning solution port.

8. The apparatus of claim 7 wherein the pole portal of the telescoping hollow pole is located between the cleaning solution portal and the brush.

9. The apparatus for cleaning surfaces according to claim 7 wherein the cleaning solution container is removable.

10. The apparatus for cleaning surfaces according to claim 6 wherein the brush is removable.

11. An apparatus for cleaning surfaces that connects to a water source consisting essentially of:

a portable cylindrical deionized water unit having:
an inlet opening, an outlet opening, a plurality of elongated interior ribs that extend along an interior of a coaxial outer chamber that encircle and separate the interior of said unit into the coaxial outer chamber and a central resin exchange chamber supported and held by the ribs wherein the outer chamber is not in flow communication into the central resin chamber and a valve located at the outlet opening with first and second positions,
wherein the valve at the first position directs water only flow through the inlet opening into the coaxial outer chamber and out through the outlet opening, the valve at the second position directs the water flow only through the central resin exchange chamber and out through the outlet opening;

a garden hose that connects the inlet opening to the water source;

a replaceable ion exchange resin cartridge that fits into the second chamber;

a brush pole system having:
a hollow pole with an inlet portal, an outlet portal, a venturi structure inside the hollow pole, a cleaning solution portal near the venturi structure to take advantage of suction created by water flowing through the hollow pole in the direction of the outlet portal into a brush;

a second hose with first and second ends, the first end connects to the outlet opening of the portable cylindrical deionized water unit; and the second end connects to the inlet portal of the pole; and a cleaning solution container with a one way venting opening, the cleaning solution container connects to the hollow pole at the cleaning solution port.

* * * * *